Jan. 1, 1963 M. PEVAR 3,071,490
BOND BETWEEN A BASE METAL AND A SPRAYED-ON METAL LAYER
Filed May 13, 1959

INVENTOR
Maxwell Pevar
BY K. L. Schiff
AGENT

United States Patent Office 3,071,490
Patented Jan. 1, 1963

3,071,490
BOND BETWEEN A BASE METAL AND A SPRAYED-ON METAL LAYER
Maxwell Pevar, 8116 Fayette St., Philadelphia 50, Pa.
Filed May 13, 1959, Ser. No. 812,871
6 Claims. (Cl. 117—50)

Great difficulties have been experienced in the past to bond a sprayed-on metal layer to a relatively smooth metal surface. This difficulty increases when the base metal itself presents a relatively thin layer which cannot be heated to elevated temperatures, for instance because it is backed up by resin.

There have been two outstanding attempts to solve the problem, but the results were only partially successful. According to the one process, the so called fuse-bond process, a nickel electrode deposits small lumps of nickel on the surface of the base metal and fuses them thereto. While the nickel is fused to the base metal, the subsequently sprayed-on layers are only mechanically bonded to the base metal and the protruding nickel particles. The strength of this bond is in most cases not sufficient, at least not for many purposes. Another disadvantage of the nickel deposit is that it requires a great deal of heat in order to get sufficient bond. This can often not be tolerated, if the base metal is relatively thin and is backed up by a material, such as resin, which cannot stand great heat. There are also other cases where nickel cannot be used, for instance because it is not compatible with the base metal in that it will not fuse or bond therewith. Use of nickel could also be objectionable for other reasons, for instance because it may not be available in times of emergency, as it has been the case in the past. Another drawback of the nickel process is its costliness. This is due to the fact that a relatively great amount is needed, though price per pound of nickel is in about the same range as that of the material used for the invention.

The other prominently known process is the so-called spray-bond process. In this process a layer of molybdenum is sprayed on the base metal surface and provides a fairly good bond between the base metal layer and the subsequent sprayed-on metal of the kind ultimately desired. However, the bond between the molybdenum and the base metal is in most cases not adequate and special additional procedures have to be employed such as machining a network of undercut grooves into the base meal surface, which then provide for a mechanical interlock between the base metal and the sprayed-on molybdenum. This of course adds to the expense and is in many cases very undesirable, because it means difficult machining and special equipment. Another disadvantage of the use of the molybdenum is that this metal has very poor oxidation resistance at elevated temperatures so that nowadays molybdenum is seldom used in aircraft work without protection. In this connection it has to be remembered that the sprayed-on metal is very porous and by no means shuts the molybdenum interface off from the access of the oxygen of the atmosphere. The molybdenum layer is also relatively expensive inasmuch as the metal itself is expensive and inasmuch as a relatively great amount is needed to fill the undercut grooves and so as to form a continuous layer.

An important consideration is that any bonding process should be such as not to restrict the amount of metal that can be sprayed on. The known processes are poor in this respect, because they involve great heat which brings about the warping or other distortions of the base metal, and because a poor bond may permit that, after reaching a certain thickness, the inner tension to lift the entire layer off from the base metal. This becomes particularly significant when the base metal has a plane surface so that the tensions cannot be equalized by existing curvatures.

It seems significant that the originators of the fuse-bond process do no longer recommend its use for repair work but recommend the spray-bond process instead thereof. This fact proves of course only the superiority of the spray-bond over the fuse-band process, but it does not prove that the spray-bond process in itself meets all the requirements. Indeed, it is the object of this invention to overcome the draw-backs of both known processes including the spray-bond process even though the latter may be better already than the fuse-bond process.

What sparked the present invention was a case in which forming dies were attempted to be repaired by the fuse-bond process and by the spray-bond process. However, both bonds proved inadequate and the sprayed-on layer which was to repair or to modify the shape of the dies came off after a few forming operations due to the inadequacy of the bond.

The novel process uses an arcing technique with the aid of a non-consumable electrode to roughen the, previously cleaned, surface in contrast to the usual machining, sandblasting or chemical etching techniques. The pitting effect of the arc-roughening produces a ragged surface with some undercutting. This type of roughening is not possible with sandblasting. In addition, materials that are extremely hard and don't lend themselves to the conventional sandblasting methods, for example air-hardening steels of Rockwell C–15 to Rockwell C–58, are easily roughened by the arc-pitting method. In chemical etching, on the other hand, the used solutions often seep down through the pores due to capillarity and may result in corrosion effects later on.

The aforedescribed pitting step is followed after a light slag-removing sandblasting, by a second step which consists therein that a thin layer of metal is sprayed on the base metal surface and is then arc-fused to the base surface. This arc-fusing does not only create a practically inseparable bond between the initial, sprayed-on layer but also repeats so to speak the procedure of roughening up of the surface and providing cavities etc. into which the subsequent sprayed-on layer will penetrate and anchor itself. The intermediate layer is preferably made of a metal having relatively low melting point, that is a melting point lower than that of the base metal. Furthermore the intermediate layer is preferably of the type which has non-shrinking characteristics.

After the arc-fusing of the intermediate layer, and after a subsequent light slag-removing sandblasting, the ultimate metal of the desired composition is sprayed on in the proper number of passages. There is believed to be no limit to the thickness of the ultimate layer to be sprayed on, inasmuch as thicknesses up to a quarter of an inch have proved entirely satisfactory.

The new process has also proved far superior to the old processes, inasmuch as in repair work it is mostly necessary to feather out the margins of the sprayed-on material so as to smoothly fair it into the adjoining surface of the base metal. With the old processes the thin marginal portions of the sprayed-on layers would peel off either due to the heat of the grinding, necessary for giving the desired surface condition, or due to the mechanical action of the grinding wheel, which the relatively weak bond of the old procedures could not withstand. No such disadvantages were found with the bond obtained by the procedure according to the invention.

By the way, in spraying on the ultimate layers the same technique should be used, which is customary also for the other bonding processes, in that each individual layer is allowed to cool off before the next layer is sprayed thereon. Hereby the creation of internal stresses and consequent distortions are avoided.

The first herein described novel step or the first two steps of surface preparation may advantageously also be used for bonding other than sprayed-on layers to the base metal. Those two sets may be used in cases where the final layer cannot be bonded by the available bonding means and techniques to the base metal, but where the interlock created by the invention will supply the necessary adherence.

The fusing of the bonding layer to the base metal need not necessarily be done by arcing but might be done by other heating methods, such as induction heating or by flame. However, the arcing is believed by far superior insofar as it results in the discontinuous rough layer and insofar as it is by far the coolest method in regard to the heating up of the base metal.

The invention and its objects and advantages will hereinafter more fully and more specifically be described in connection with an embodiment which is diagrammatically illustrated in the attached drawing.

Figure 1:
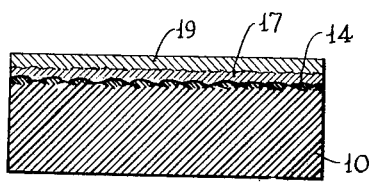
FIG. 1 is a cross-section through a base metal layer, bonding layer and two sprayed-on superimposed final layers.

Whereas in the preceding general outline of the invention and in its comparison with the state of the art, the main steps of the invention have briefly been described and though only these main steps are illustrated in the drawing, there are other preliminary and intervening steps which now will be included in the following more comprehensive description of carrying out the invention.

The details of procedure, the metal composition, the types of electrodes etc., will be described in the following in relation to actually used items, though it should be understood that this is only by way of example and that in each new situation certain allowances, such as for differences in the composition or the surface condition of the base metal, for the desired composition of the ultimate layer etc., have to be made, and that the following description is not to be understood as being restrictive in regard to the scope of the invention to be covered by the attached claims.

In the illustrated, actually produced example, the base metal 10 was in itself a sprayed metal, the surface 11 of which had been polished, so that, without special preparation, it would not offer proper adhesion to a metal subsequently to be sprayed thereon. This base metal layer consisted of Metcoloy No. 2, a proprietary name which corresponds to SAE Standard No. 51 335 stainless chromium iron and has about the following composition: 0.25% carbon, 0.29 manganese, 0.35 silicon, 0.025 phosphorus, 0.004 sulfur, 13.20 chromium, 0.32 nickel, 0.05 molybdenum, and the balance iron. It has a melting point of 2600° F.

The surface 11 of the base metal 10, to be provided with a sprayed-on additional layer, is first cleaned with a customary solvent having degreasing and other cleaning characteristics.

Figure 2:
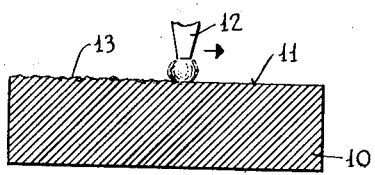
FIG. 2 illustrates the first main step in carrying out the invention, namely the step of pitting the surface of the base metal by means of an arcing electrode.
Figure 5:
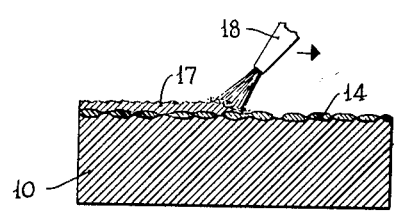
FIG. 5 illustrates the spraying-on of the ultimate layer or layers by repeated passages of a metal spraying gun.
Figure 3:
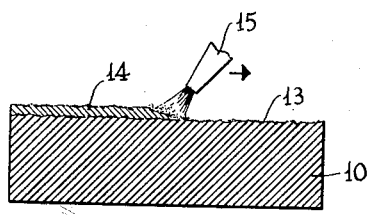
FIG. 3 illustrates the step of spraying-on the bonding layer on the metal surface prepared in accordance with FIG. 2.

The clean surface 11 is now roughened by passing over it an electrode 12 back and forth, and electrode 12 being connected to one pole and the metal base 10 to the other pole of a source of current (not shown). The broken line 13 on the left side of the electrode 12 in FIG. 2 diagrammatically illustrates the pitted surface obtained by the arcing and this surface 13 is also visible in subsequent figures and in the micro-photograph of FIG. 6.

A quarter inch diameter electrode has been used; satisfactory secondary current values for relatively small surfaces were found to be 8 to 16 volts and 150 to 300 amperes. For larger areas increased voltages would be required even though each individual single electrode, at a given time, only contacts or sweeps over a certain surface irrespective of how large the entire surface is. The current values also should vary with the type and the thickness of the base metal. Instead of using a single electrode as diagrammatically illustrated in the drawing, in actual production a series of electrodes will be used under corresponding current application.

The arcing leaves a carbonaceous surface deposit. This is removed in a further step by the light passage of sandblasting with a medium grit. The sandblasting is to be conducted, so as not to materially change the surface structure of the metal, which should remain as ragged as possible.

After this blasting, a thin layer 14 of fusable metal is sprayed on the arc-pitted area 13 by gun 15. This layer 14 may be deposited in a single passage or in two or several passages of the spraying gun. The thickness of the layer 14 may be in the order of .001 to .006 inch, although it must be understood that the thickness may be influenced by different factors such as the alloys of this layer, of the base metal and of the metal subsequently to be sprayed-on.

For this layer 14 Metcoweld "H" was found suitable. This is an alloy consisting of chromium, nickel and boron in a plastic binder, the latter burning away during the spraying operation. The melting point of this alloy is about 1900° F. More specifically, the composition of this alloy believed to be as follows: 70% nickel, 16% chromium, 4% boron, 10% silicon-carbide. The general characteristics of a metal best suitable for this bonding layer are relatively low melting point and low shrinkage.

Figure 4:
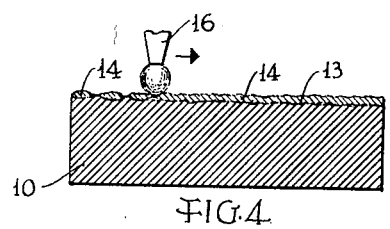
FIG. 4 illustrates the fuse-bonding and arc-roughening of the bonding layer by means of the renewed passage of an electrode.

The sprayed-on bonding layer 14 is now, as diagrammatically shown in FIG. 4, arc-fused to the base metal 10 and besides simultaneously roughened by means of subjecting it to arcing. For this purpose again serves an electrode 16 in an electric circuit with slightly lower secondary voltage and amperage as employed for pitting the original surface 11 of the base metal 10, as shown in FIG. 2. Excessive voltage and amperage for this second pitting and fusing would sputter away the deposited intervening layer 14. The fused and pitted surface of the layer 14 is diagrammatically shown by the broken lines in FIG. 4. Here again, instead of using a single electrode with a corresponding great number of individual passages, a series of electrodes will be used in actual production work.

The fusing and pitting, shown in FIG. 4 is against followed by removing any carbonaceous deposit by means of a short blast with a fine abrasive.

Now the only or the first finale layer 17 is sprayed on by a gun 18 in any number of appropriate passages. The bond having been established with the base metal 10, any number of metal layers can be applied until the desired thickness of the layer 17 has been achieved. Good results were achieved by spraying on at close range a layer of Metcoloy No. 2 followed by a build-up of thickness by spraying on the desired metal. After the initial one or two passages of the spraying gun, the distance between gun and surface is preferably be increased. For the initial passages the distance will be 8 to 10 inches whereas the distance for the subsequent passages may be in the order of 18 inches. The greater distance has the advantage of covering a larger area whereas the initial shorter distance assures more perfect bond and fusion.

The Metcoloy No. 2 was mainly used for the reason that it is very hard and has the same properties obtained with the same metal for making the initial die which has been taken as an example for the invention. When hardness is of no particular consideration, then one does better with a softer material, for instance bronze, which can be easier polished and cleaned off and brought exactly to the desired final shapes.

Should layer 17 be of bronze then it is considered to be advantageous if the intermediate layer 14 is of a metal having a lower shrinkage than bronze.

Under certain conditions and for certain purposes it is considered best to built the final layer up of two different, sequentially applied partial layers 17 and 19 as shown in FIG. 1. The layer 17 may be Metcoloy No. 2 which sometimes is not of the composition which the ultimate surface of the article should have. However, this metal is selected because it has a particular low shrinkage value which is believed to be beneficial for maintaining the good bond. The layer 17 is then covered by layer 19 of the metal ultimately desired, such as aluminum bronze which has a high shrinkage value and which therefore might not supply as good a bond with the bonding layer 14 as undoubtedly is obtained with the sprayed-on Metcoloy No. 2 layer 17.

Figure 6:
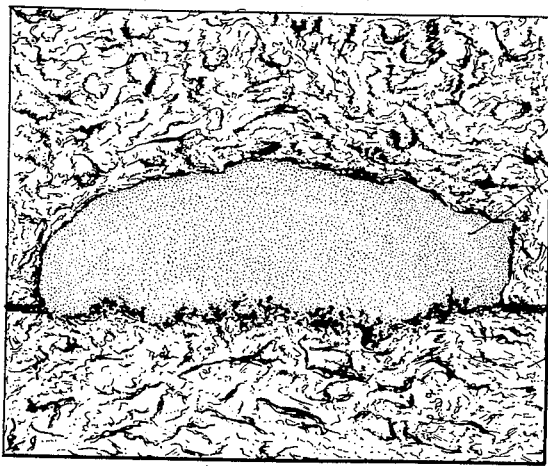
FIG. 6 is an etched micro-section through the adjacent portions of the different layers: the base metal, the intervening bonding layer, and the sprayed-on layer.

Coming now to the reproduction of an etched microphotograph as shown in FIG. 6, one will see that the surface of the base metal 10 is roughened at 13, that the bonding layer 14 after having been arc-fused forms something like drops which are fused to the base metal 10 and interlock therewith, and which themselves provide undercut portions serving for interlocking the final sprayed-on layer 17.

A great advantage of the invention over other processes for depositing metal layers also is that it is generally non-toxic and that it can be carried out anywhere in just observing ordinary health and safety standards in regard to dust removal etc. This is of course known from other spraying procedures which however, as outlined herein before, cannot always be used due to the insufficient bond and had in the past to be replaced by entirely different procedures.

What is claimed is:

1. In a method of improving the bond between the surface of a metal base and a material superimposed thereon, the steps of spraying a thin intermediate metal layer on said surface, of fusing said thin layer to said base surface and of pitting and at least partly transforming it into droplets by electric arcing, prior to the application of said material.

2. A method of improving the bond between the surface of a metal base and a material to be superimposed thereon, the steps, preceding the application of said material, of pitting said surface by electric arcing, of spraying a thin intermediate metal layer on said surface, and of fusing said thin layer to said surface by electric arcing in simultaneously pitting and roughening it.

3. In a method according to claim 1, the further step, following the electric arcing but preceding the application of said material, of lightly blasting said surface with an abrasive in such a manner as to remove carbonaceous deposits left by the arcing without materially smoothening the said intermediate layer.

4. In a method according to claim 1, comprising the use for the intermediate layer of a metal having a lower melting point than a metal subsequently sprayed on for forming said additional material.

5. In a method according to claim 2, comprising the use for the intermediate layer of a metal having a lower melting point, a lower thermal shrinkage, and a greater hardness than a metal subsequently sprayed on for forming said additional material.

6. Method of providing a metal base with a rough surface comprising the steps of spraying a thin metal layer on the surface of said metal base and of fusing said thin layer to said surface thereby pitting and at least partly transforming it into droplets by electric arcing.

References Cited in the file of this patent

UNITED STATES PATENTS

| | | |
|---|---|---|
| Re. 22,397 | Meduna | Nov. 30, 1943 |
| Re. 22,398 | Meduna | Nov. 30, 1943 |
| 2,214,002 | Trainer et al. | Sept. 10, 1940 |
| 2,249,723 | Orr | July 15, 1941 |
| 2,314,902 | Shepard | Mar. 30, 1943 |
| 2,414,923 | Batcheller | Jan. 28, 1947 |
| 2,416,125 | Simpson | Feb. 18, 1947 |
| 2,449,917 | Tansley | Sept. 21, 1948 |
| 2,588,421 | Shepard | Nov. 11, 1952 |
| 2,856,682 | Chyle | Oct. 21, 1958 |
| 2,912,562 | Donovan | Nov. 10, 1959 |
| 2,994,762 | Todd | Aug. 1, 1961 |